US009956749B2

(12) United States Patent
Yizze, III et al.

(10) Patent No.: US 9,956,749 B2
(45) Date of Patent: May 1, 2018

(54) CAPACITIVE TOUCH SCREEN FORMED BY INJECTION COMPRESSION MOLDING

(71) Applicant: Ford Global Technologies, LLC, Dearborn, MI (US)

(72) Inventors: James Paul Yizze, III, Shelby Township, MI (US); Bernard Gerard Marchetti, Rochester Hills, MI (US); Charles Alan Rocco, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 808 days.

(21) Appl. No.: 14/153,229

(22) Filed: Jan. 13, 2014

(65) Prior Publication Data

US 2015/0197075 A1   Jul. 16, 2015

(51) Int. Cl.

| | |
|---|---|
| *B32B 27/20* | (2006.01) |
| *B32B 27/36* | (2006.01) |
| *B29C 45/56* | (2006.01) |
| *B29C 45/14* | (2006.01) |
| *B32B 27/08* | (2006.01) |
| *B32B 27/30* | (2006.01) |
| *B29K 69/00* | (2006.01) |
| *B29L 9/00* | (2006.01) |

(52) U.S. Cl.
CPC ............ *B32B 27/365* (2013.01); *B29C 45/14* (2013.01); *B29C 45/561* (2013.01); *B32B 27/08* (2013.01); *B32B 27/20* (2013.01); *B32B 27/302* (2013.01); *B29C 2045/5615* (2013.01); *B29K 2069/00* (2013.01); *B29L 2009/00* (2013.01); *B32B 2307/404* (2013.01); *B32B 2307/4026* (2013.01); *B32B 2457/00* (2013.01); *Y10T 428/269* (2015.01); *Y10T 428/31507* (2015.04)

(58) Field of Classification Search
CPC ..... B32B 27/20; B32B 27/365; B32B 27/302; B32B 2307/4026; B32B 2457/00; B29C 2045/5615
See application file for complete search history.

(56) References Cited

U.S. PATENT DOCUMENTS

| | | | |
|---|---|---|---|
| 5,846,466 A | 12/1998 | Abe et al. | |
| 6,413,598 B1 | 7/2002 | Motoki et al. | |
| 7,862,220 B2 | 1/2011 | Cannon et al. | |
| 9,139,716 B2* | 9/2015 | Crandon | C09D 5/002 |
| 2003/0092794 A1* | 5/2003 | Gallas | B32B 27/08 523/137 |
| 2004/0170773 A1* | 9/2004 | Huffer | B32B 27/32 427/551 |
| 2006/0258829 A1* | 11/2006 | Wang | C08G 18/10 526/319 |
| 2007/0059541 A1* | 3/2007 | Yoshida | B32B 27/36 428/475.2 |
| 2009/0101721 A1* | 4/2009 | Hawthorne | G06K 19/07 235/492 |
| 2010/0255347 A1 | 10/2010 | Tomekawa et al. | |
| 2010/0314034 A1* | 12/2010 | Zou | B44C 1/17 156/221 |
| 2011/0109564 A1* | 5/2011 | Lee | B32B 38/145 345/173 |
| 2011/0230582 A1* | 9/2011 | Kito | C09D 11/101 522/39 |
| 2012/0019475 A1* | 1/2012 | Li | G06F 3/044 345/174 |
| 2012/0052929 A1* | 3/2012 | Thammasouk | G06F 1/1626 455/575.1 |
| 2012/0225241 A1 | 9/2012 | Kashima et al. | |
| 2012/0321865 A1* | 12/2012 | Laksin | C09D 11/101 428/203 |
| 2013/0257791 A1* | 10/2013 | Mo | G06F 3/044 345/174 |

* cited by examiner

*Primary Examiner* — Charles Boyer
(74) *Attorney, Agent, or Firm* — Marla Johnston; Brooks Kushman P.C.

(57) ABSTRACT

According to one or more embodiments, a polymeric article includes a first polymeric layer defining a first portion and a second portion, the first portion having a first side and a second side opposing the first side, the first side being exposed to atmospheric air, and an ink layer and a second polymeric layer, the ink layer being positioned between the second polymeric layer and the second portion of the first polymeric layer.

16 Claims, 4 Drawing Sheets

CAPACITIVE TOUCH SCREEN FORMED BY INJECTION COMPRESSION MOLDING

TECHNICAL FIELD

The disclosed inventive concept relates generally to polymeric articles and particularly polymeric articles formed by injection compression molding.

BACKGROUND

In certain existing methods, standard injection molding may be used for production of polycarbonate articles particularly polycarbonate articles with capacitive touch parts. These methods have been met with limited use. For instance, when injection molding takes places behind such polycarbonate articles, ink washout often occurs at injection gates. Ink washout occurs during the injection of polycarbonate resin due to high temperature and pressure. Ink washout may also cause visual and electrical failure.

It would thus be advantageous if polymeric articles such as polycarbonate articles may be produced without these identified problems, particularly problems in relation to ink washout.

SUMMARY

According to one or more embodiments, a polymeric article includes a first polymeric layer defining a first portion and a second portion, the first portion having a first side and a second opposing the first side, the first side being exposed to atmospheric air, and an ink layer and a second polymeric layer, the ink layer being positioned between the second polymeric layer and the second portion of the first polymeric layer.

The first portion and the second portion of the first polymeric layer may be positioned next to each other along a longitudinal axis of the first polymeric layer.

The second polymeric layer may include a first sub-layer and a second sub-layer chemically different from the first sub-layer, the first sub-layer being positioned between the ink layer and the second sub-layer.

In one or more other embodiments, a method of producing a polymeric article includes subjecting a formed polymeric part to injection compression molding, the formed polymeric part including a first polymeric layer and an ink layer, the first polymeric layer defining a first portion and a second portion, the first portion having a first side and a second opposing side, the first side being exposed to atmospheric air, wherein a second polymeric layer is formed upon the ink layer via injection compression molding such that the ink layer is positioned between the second polymeric layer and the second portion of the first polymeric layer.

The above advantages and other advantages and features will be readily apparent from the following detailed description of embodiments when taken in connection with the accompanying drawings.

BRIEF DESCRIPTION OF THE DRAWINGS

For a more complete understanding of embodiments of this invention, reference should now be made to the embodiments illustrated in greater detail in the accompanying drawings and described below by way of examples wherein.

DETAILED DESCRIPTION OF ONE OR MORE EMBODIMENTS

Figure 1:
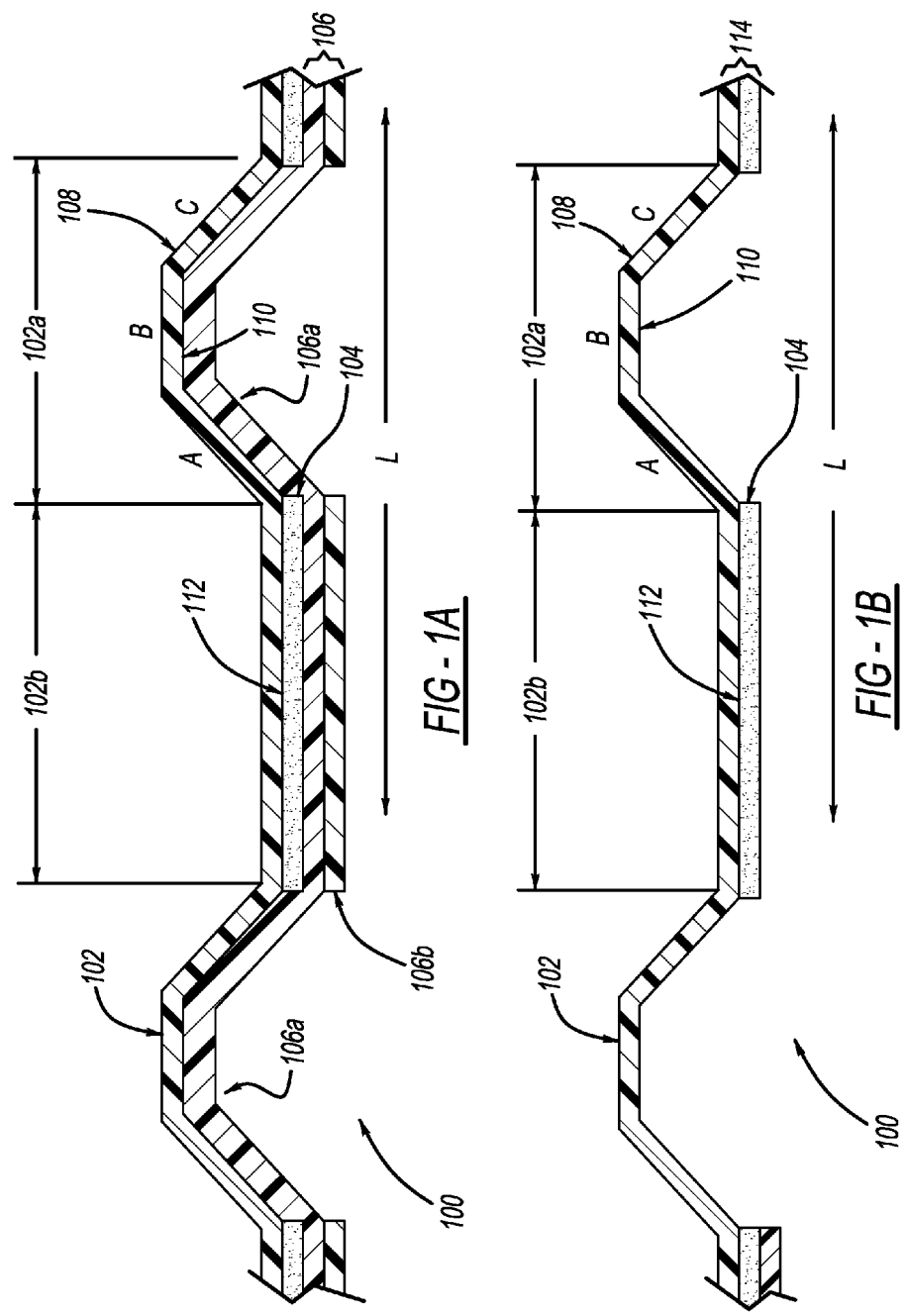
FIG. 1A depicts a cross-sectional view of a polymeric article according to one or more embodiments.
FIG. 1B depicts a cross-sectional view of a precursor of the polymeric article referenced in FIG. 1A.

As referenced in the FIG.s, the same reference numerals are used to refer to the same components. In the following description, various operating parameters and components are described for different constructed embodiments. These specific parameters and components are included as examples and are not meant to be limiting.

The disclosed inventive concept overcomes one or more the problems associated with known production of polymeric articles, particularly polycarbonate articles, and more particularly polycarbonate articles with decorative or capacitive touch parts.

In one or more embodiments, FIG. 1A depicts a cross-sectional view of a polymeric article generally shown at 100. The polymeric article 100 includes a first polymeric layer 102 defining a first portion 102a and a second portion 102b, the first portion 102a having a first side 108 and a second opposing side 110, the first side being exposed to atmospheric air; and an ink layer 104 and a second polymeric layer 106, the ink layer 104 being positioned between the second polymeric layer 106 and the second portion 102b of the first polymeric layer 102.

The first and second polymeric layers 102, 106 may each include any suitable polymer. Non-limiting examples of the polymer include nylon, polyvinyl chloride, polystyrene, polyethylene, polyacrylonitrile and polycarbonate. In certain instances, the first and second polymeric layers 102, 106 each independently include polycarbonate. In certain particular instances, the polycarbonate as included within or being used for forming the first and/or second polymeric layers 102, 106 is of optical grade, which is substantially transparent to light.

The ink layer 104 may be electronically conductive or just a composition with a color pigment for cosmetic purposes. When used as conductive ink, the ink layer 104 may include silver and/or carbon like materials, which are optionally configured as powders or flakes. The ink layer 104 may be formed via circuit printing.

A non-limiting example of the polymeric article 100 includes overhead console with buttons for dome lamps, moon-roof, and radio bezel with push buttons, window switch bezels, and any part with a push button integrated in. In a particular example, the first portion 102a may be the polymeric window portion for letting the backlight to go through. Therefore, in such instances, the first portion 102a is of optical or lens grade. Because the first portion 102a is continuous in material relative to the second portion 102b as being defined within the first polymeric layer 102, the first polymeric layer is entirely of optical or lens grade when the first portion 102a is of optical or lens grade.

The present invention in one or more embodiments is advantageous at least in that the second polymeric layer 106 can be molded onto the conductive ink layer 104 without necessarily causing ink washout. As a result of that benefit, the first portion 102a can be left in as an integral portion to the first polymeric layer 102 when being subject to the molding process of depositing the second polymeric layer 106 as is detailed herein elsewhere. This would not readily be possible with prior method(s) where ink washout would also cause unwanted relocation of ink onto the first portion 102a, which may result in unusable lens or window area corresponding to the first portion 102a. Therefore in those prior methods, the portion corresponding to the first portion 102a on the first polymeric layer 102 would have to be left open as a void space and a separate polymeric portion of optical or lens grade would be connected in only after the injection molding is completed. The present polymeric article and the method of making the same as detailed herein below both simplify manufacturing processes and provide cost efficiencies.

Figure 3A:
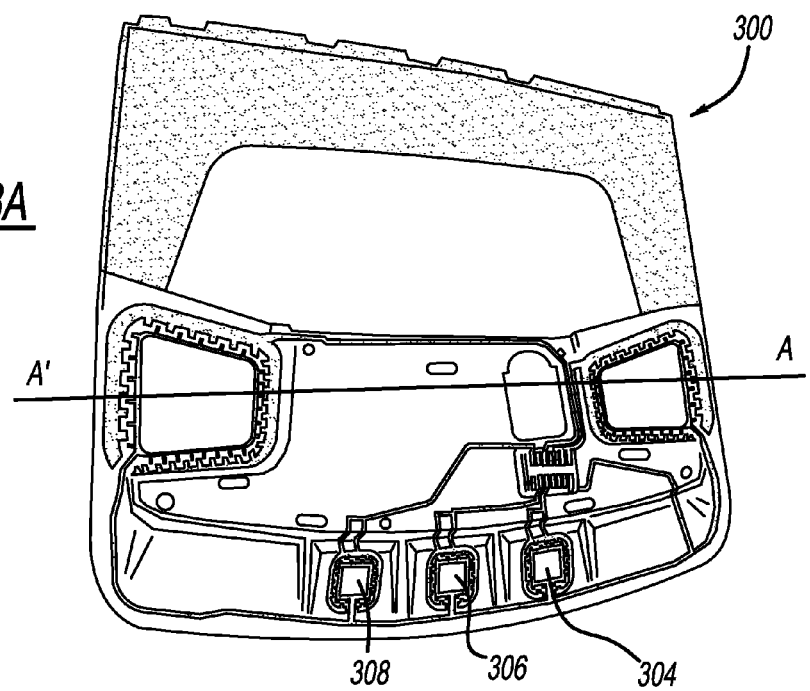
FIG. 3A depicts a non-limiting example of a formed ink printed polymeric part in a back view.
Figure 3B:
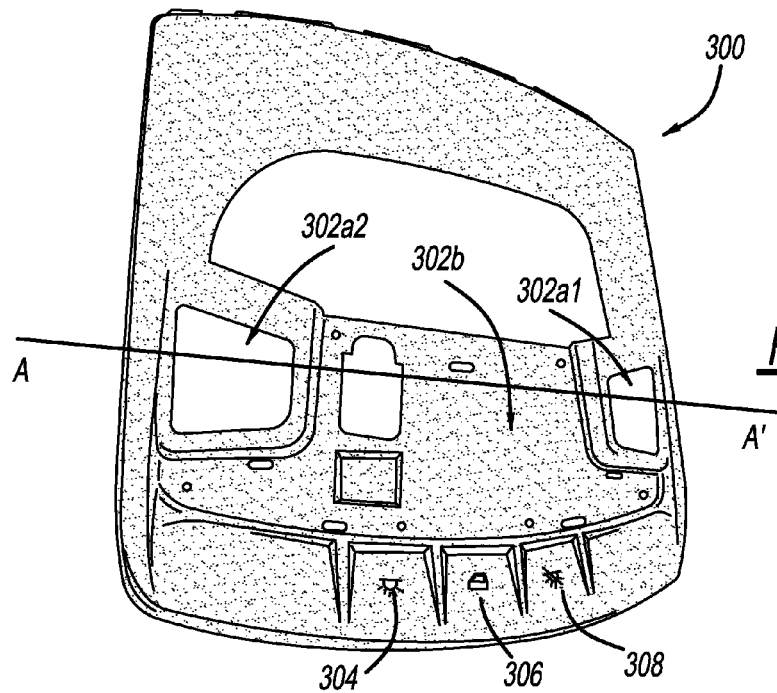
FIG. 3B depicts in a front view of the formed ink printed polymeric part referenced in FIG. 3A.

Referring back to FIG. 1A, the first portion 102a and the second portion 102b of the first polymeric layer 102 may be positioned next to each other along a longitudinal axis "L" of the first polymeric layer 102. The longitudinal axis "L" may be defined in contrast to a thickness dimension of the first polymeric layer 102. For instance, and in reference to article 300 referenced in FIGS. 3A and 3B, the longitudinal axis "L" may be represented by line A-A', along which there are light-through window portions 302a1 and 302a2 illustrative of the first portion 102a of FIG. 1A, and a solid portion 302b illustrative of the second portion 102b of FIG. 1A.

Referring back to FIG. 1A and in illustrative view of the polymeric article 100, the first portion 102a may have a surface linear dimension "SLD" of no less than 0.5 centimeters, 1.0 centimeters, or 2 centimeters. The surface linear dimension "SLD" may be a sum in length of portion "A", portion "B" and portion "C" of the first portion 102a of the first polymeric layer 102, as referenced in FIG. 1A.

Referring back to the polymeric article 300, portions 304, 306 and 308 are non-limiting examples of the capacitive touch parts that may be present on the polymeric article 300. The capacitivity is provided at least in part by the ink layer 104. In certain instance, and as stated herein elsewhere, conductibility of the ink layer 104 may be due to the use of silver in powders or in flakes.

Referring back to FIG. 1A, the second polymeric layer 106 may itself include two or more sub-layers. As maybe detailed herein elsewhere, the second polymeric layer 106 provides not only the protection over the ink layer 104 but also the structural attachments for downstream assembly. Therefore, at least in this connection, the second polymeric layer 106 is indispensable for the integrity of the final product. To form the structural attachments which can be of a number of variable shapes and configuration, an injection molding may be necessary to first melt the polymer material and then the injection cavity imparts the particular shape and configuration to the injected polymer material to form the second polymeric layer 106. The present invention is synergistic in not only effectuating the use of one continuous layer of first polymeric layer (made possible by a reduction in ink washout) but also providing cost efficiencies. The sub-layers may be of different compositions to afford certain desirable structural variation to the polymeric article 100. For instance, and as depicted in FIG. 1A, the second polymeric layer 106 includes a first sub-layer 106a and a second sub-layer 106b chemically different from the first sub-layer, the first sub-layer 106a being positioned between the ink layer 104 and the second sub-layer 106b. The first sub-layer 106a may be lighter in color than the second sub-layer 106b. In certain instances, the first sub-layer 106a is formed by a layer of clear polycarbonate and the second sub-layer 106b is formed by a layer of colored polycarbonate. The colored polycarbonate may be a blend of clear polycarbonate with another polymer, such as acrylonitrile butadiene styrene (ABS), which is chemically different from polycarbonate. Without wanting to be limited to any particular theory, it is believed that relative to polycarbonate, ABS may be more adaptable to an addition of color pigment. Therefore, a pigment-added ABS may be pre-blended with polycarbonate to at least partially function as a barrier to guard against unwanted escape of light.

Figure 2:
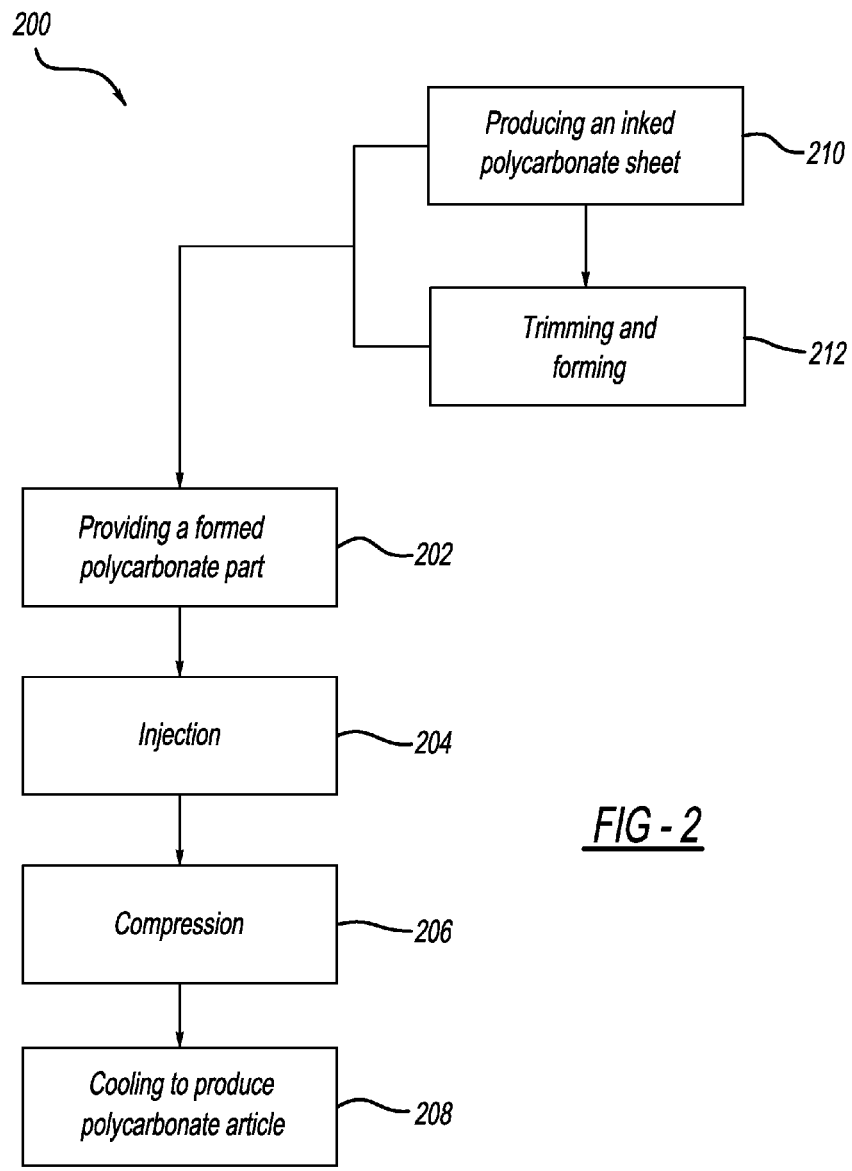
FIG. 2 depicts a non-limiting process for making the polymeric article referenced in FIG. 1A.
Figure 4A:
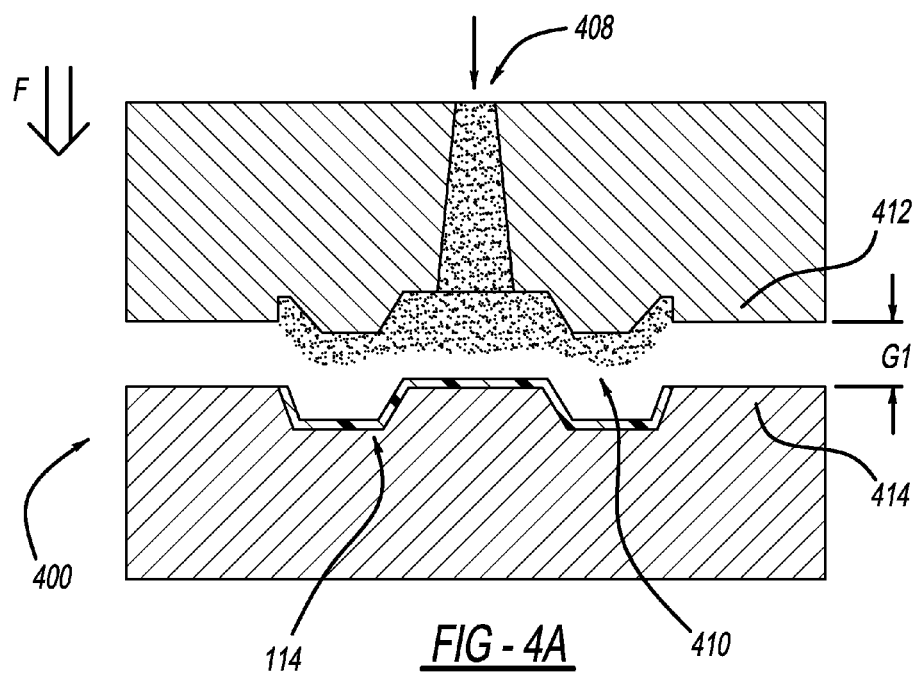
FIG. 4A depicts a cross-sectional view of a mold during an injection stage of the non-limiting process referenced in FIG. 2.
Figure 4B:
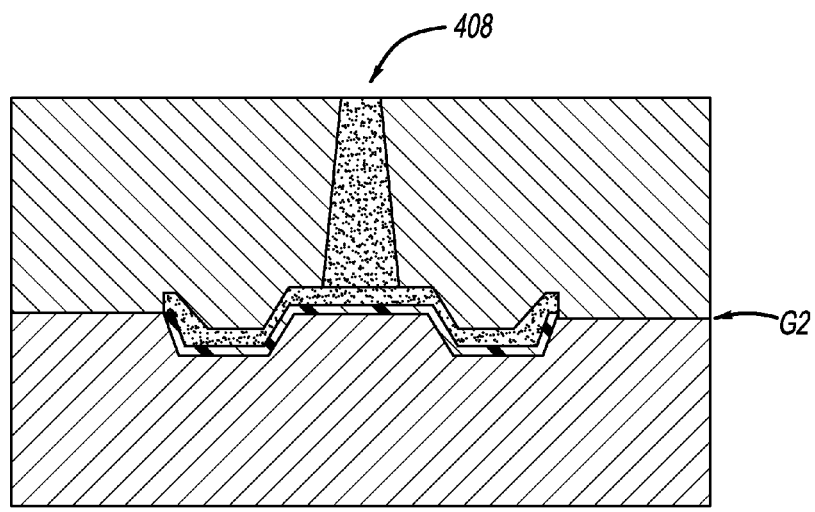
FIG. 4B depicts a cross-sectional view of the mold during a compression state of the non-limiting process referenced in FIG. 2 in view of FIG. 4A.

In view of FIG. 4A and FIG. 4B, FIG. 2 depicts a non-limiting method 200 for making the polymeric article 100. At step 202, a formed polymeric part is provided to an injection compression mold 400. As provided, the formed polymeric part includes the first polymeric layer 102 and the ink layer 104. The formed polymeric part is illustratively shown at 114 in FIG. 1B.

At step 204, the formed polymeric part 114 is positioned within a molding cavity 410 of the injection compression mold 400. The injection may be carried out such that no less than 50, 60, 70, 80 or 90 dry weight percent of the second polycarbonate layer 106 is introduced to the molding cavity 410 prior to compression. The polymeric material may be introduced into the mold cavity before, during and/or after the mold parts 412, 414 are separated by the gap "G1." The value of the gap "G1" may vary based on a particular project at hand; and in some instances, the value of the gap "G1" may depend on one or more parameters including the size and configuration of the formed part, the type of the polymeric material, and the speed at which the gap "G1" is obtained.

The injection cavity may have a gap distance "G1" of 0.05 to 0.5 inches, 0.10 to 0.4 inches, or 0.5 to 0.3 inches along a direction of injection flow "F" referenced in FIG. 4A. Opening up the mold parts 412, 414 provides a departure from certain existing methods of forming a polymeric article wherein the "G1" would have been substantially kept at zero or that the mold parts 412 and 414 are contacting each other so that the cavity 410 is isolated from atmospheric air.

The injection molding may be carried out at a pressure of no greater than 15,000 psi, 12,000 Psi, 9,000 psi, or no greater than 6,000 psi.

In view of FIG. 4B, and at step 206, the formed polymeric part and the injected portion of the second polymeric layer 106 are subject to compression. Once the compression is completed, the polymeric article 100 is formed as indicated at step 208.

Referring back to step 202, the formed polymeric part may further be prepared as follows. Steps 210 and 212 may only be optional to performing the present invention in one or more embodiments. The polymeric sheet with ink printed may be pre-formed. At step 210, a polymeric sheet is screen printed with decorative or conductive ink to form an ink printed polymeric sheet. At step 212, the ink printed polymeric sheet is then thermoformed and trimmed to become the formed polymeric part that is ready for the subsequent steps including steps 204 and 206.

Referring back to FIG. 4A, the molding cavity 410 is defined by an upper portion 412 and a lower portion 414 of the mold 400. A stream of molten polymer, such as molten polycarbonate, is introduced into the molding cavity 410 via an injection gate 408. The molding cavity 410 is initially set with a gap distance of G1 in comparison to a gap distance of G2 at a later compression step referenced in FIG. 4B, wherein G2 is smaller in value than G1.

By setting an initial gap distance at G1 during the injection stage, the stream of molten polymer such as polycarbonate can be introduced at a relatively lower pressure. This is advantageous at least in that portions of ink in the vicinity of the injection gate 408 have a lesser tendency to washout due to the relatively lower pressure.

In certain instances, an operating pressure measured at the injection gate 408 can be substantially lowered and maintained at the substantially lowered value before at least 70 percent, 80 percent or 90 percent of the total target amount of the polymer such as polycarbonate is introduced within the cavity. The term "substantially lowered" or the term "the substantially lowered value" refers to an operating pressure that is at least 5 percent, 10 percent, 15 percent, or 20 percent lower than an operating pressure in a straight injection molding without the subsequently coupled compression stage referenced in FIG. 4B. In certain instances, an operating pressure measured at the injection gate 408 is in a range of 4,000 psi to 12,000 psi, 5,000 psi to 10,000 psi, or 6,000 psi to 8,000 psi.

As stated herein, the substantially lowered operating pressure is effectuated at least in part by an increase in gap distance G1 set forth in the initial injection stage referenced in FIG. 4A. For a given injection machine, the surface area of its injection cavity is often fixed. Because the surface area of the injection cavity is not readily or easily amenable for design changes, the present invention in one or more embodiments is particularly advantageous in that a seemingly effortless increase in the gap distance G1 is positioned to provide an environment suitable for a reduction in ink washout.

The touch parts can be capacitive or resistive. Capacitive touch parts are believed to rely on the electrical properties of the human body to detect when and where on a display the user touches. Because of this, capacitive displays can be controlled with very light touches of a finger and generally cannot be used with a mechanical stylus or a gloved hand. Non-limiting examples of capacitive touch parts are cell phone touch screens in various brands.

Referring back to FIG. 3B, the polymeric article 300 may further be color coated, for instance, by painting, to obtain a protective color coating.

The ink may be applied onto the polymeric sheet via any suitable methods including screen printing. Screen printing may be particularly suitable for certain polymer materials such as polycarbonate because polycarbonate may not necessarily require surface pretreatment prior to printing. And, since polycarbonate withstands higher curing temperatures than polyester, the stability of these films allows the printer to maintain better registration.

The polymeric sheet as provided should have certain qualifications prior to its application to the injection compression molding. For instance, the polymeric sheets should be relatively dry such that ink washout is kept at a necessary minimum. Force drying of the inks at temperatures between 130° and 150° F. may be used prior to the injection compression molding process. When printing with UV inks, thinner ink deposits are generally better, because the UV light can more easily penetrate and more thoroughly cure the layer of ink. If the ink deposit is too thick, the UV light will not fully penetrate the ink. This can mean that the layer of ink that is making contact with the substrate is not cured or is not fully cured. Usually this uncured or under-cured ink is too soft to bond or adhere to the substrate.

Injection molding is a manufacturing process for producing parts by injecting material into a mold. In general, material for the part is fed into a heated barrel, mixed, and forced into a mold cavity where it cools and hardens to the configuration of the cavity.

Two shot injection molding enables the combination of two different plastic materials or two different colored plastics into one composite component through a single manufacturing process. It also allows for a soft plastic layer to be molded over a tougher plastic to produce soft tactile effects.

In one or more embodiments, the disclosed invention as set forth herein overcomes the challenges faced by known production of polymeric articles such as polycarbonate articles with decorative or capacitive touch parts. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A capacitive touch-screen comprising:
    a first polymeric layer defining first and second portions each having a first side exposed to air and a second side opposing the first side;
    a second polymeric layer arranged on the second side of the first and second portions and in direct contact with the first portion; and
    a conductive ink layer arranged between and in contact with the second side of the second portion and the second polymeric layer.

2. The capacitive touch-screen of claim 1, wherein the first portion is ink-layer-free.

3. The capacitive touch-screen of claim 1, wherein the first and second portions of the first polymeric layer are positioned next to each other along a longitudinal axis of the first polymeric layer.

4. The capacitive touch-screen of claim 1, wherein at least one of the first and second polymeric layers includes polycarbonate.

5. The capacitive touch-screen of claim 1, wherein the first portion has a surface linear dimension of greater than 2 centimeters.

6. The capacitive touch-screen of claim 1, wherein the ink layer comprises a circuit board.

7. The capacitive touch-screen of claim 1, wherein the second polymeric layer includes a first sub-layer and a second sub-layer chemically different from the first sub-layer, the first sub-layer being positioned between the ink layer and the second sub-layer.

8. The capacitive touch-screen of claim 7, wherein the first sub-layer is lighter in color than the second sub-layer.

9. The capacitive touch-screen of claim 7, wherein the first sub-layer comprises polycarbonate and the second sub-layer includes a polymer other than polycarbonate.

10. A polymeric article comprising:
    a first polymeric layer of optical grade and defining a first portion and second portions each having a first side and a second side opposing the first side;
    a second polymeric layer arranged on the second side of the first and second portions and in direct contact with the first portion; and
    an electronically conductive ink layer arranged between and in contact with the second side of the second portion and the second polymeric layer,
    wherein the article is a capacitive touch article.

11. The polymeric article of claim 10, wherein the first and second portions of the first polymeric layer are positioned next to each other along a longitudinal axis of the first polymeric layer.

12. The polymeric article of claim 10, wherein the second polymeric layer includes a first sub-layer and a second sub-layer chemically different from the first sub-layer, the first sub-layer being positioned between the ink layer and the second sub-layer.

13. The polymeric article of claim 12, wherein the first sub-layer comprises polycarbonate and the second sub-layer includes a polymer other than polycarbonate.

14. The capacitive touch-screen of claim 1, wherein the first and second portions are in material continuity.

15. The capacitive touch-screen of claim 1, wherein the article comprises more than one first and second portions such that a plurality of first and second portions alternate.

16. The capacitive touch-screen of claim 2, wherein the ink layer is free of contact with the second side of the first polymeric layer.

\* \* \* \* \*